(12) United States Patent
Chiang et al.

(10) Patent No.: US 9,536,131 B1
(45) Date of Patent: Jan. 3, 2017

(54) FINGERPRINT RECOGNITION METHODS AND ELECTRONIC DEVICE

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 14/691,178

(22) Filed: Apr. 20, 2015

Related U.S. Application Data

(60) Provisional application No. 62/052,162, filed on Sep. 18, 2014.

(51) Int. Cl.
*G06K 9/00* (2006.01)
*G06F 17/30* (2006.01)
*G06F 21/32* (2013.01)

(52) U.S. Cl.
CPC ..... *G06K 9/00087* (2013.01); *G06F 17/30247* (2013.01); *G06F 21/32* (2013.01); *G06K 9/00013* (2013.01); *G06K 9/0002* (2013.01)

(58) Field of Classification Search
None
See application file for complete search history.

(56) References Cited

U.S. PATENT DOCUMENTS

| | | | | |
|---|---|---|---|---|
| 6,125,192 | A * | 9/2000 | Bjorn | G06F 21/32 340/5.83 |
| 6,141,436 | A * | 10/2000 | Srey | G06K 9/00013 340/5.74 |
| 6,799,275 | B1 * | 9/2004 | Bjorn | G06F 21/32 283/67 |
| 7,949,609 | B2 * | 5/2011 | Colella | G06Q 20/382 235/380 |
| 8,036,431 | B1 * | 10/2011 | Fisher | G06K 9/00013 382/115 |
| 8,719,584 | B2 * | 5/2014 | Mullin | G06F 1/1626 713/182 |
| 2002/0095588 | A1 * | 7/2002 | Shigematsu | G06Q 20/367 713/186 |
| 2002/0150283 | A1 * | 10/2002 | Mimura | G06K 9/00087 382/124 |
| 2002/0164058 | A1 * | 11/2002 | Aggarwal | G06F 21/305 382/125 |
| 2004/0125993 | A1 * | 7/2004 | Zhao | G06K 9/00006 382/124 |
| 2010/0026451 | A1 * | 2/2010 | Erhart | G06K 9/00013 340/5.53 |

(Continued)

*Primary Examiner* — Shervin Nakhjavan

(57) ABSTRACT

An electronic device and method are provided. The fingerprint recognition method includes: obtaining a verification fingerprint image; transmitting the verification fingerprint image to the second processing unit; generating verification fingerprint data according to the verification fingerprint image by the second processing unit; transmitting the verification fingerprint data to the first processing unit by the second processing unit; comparing the verification fingerprint data with a plurality of registered fingerprint datasets to generate matching information by the first processing unit; transmitting the matching information from the first processing unit to the second processing unit; and verifying the verification fingerprint data according to the matching information by the second processing unit.

22 Claims, 8 Drawing Sheets

(56) References Cited

U.S. PATENT DOCUMENTS

2013/0083208 A1* 4/2013 Koh .................. H04N 5/232
 348/207.2
2014/0072188 A1* 3/2014 Liu ................. G06K 9/00979
 382/125

* cited by examiner

FINGERPRINT RECOGNITION METHODS AND ELECTRONIC DEVICE

CROSS REFERENCE TO RELATED APPLICATIONS

This Application claims priority of Provisional Patent Application No. 62/052,162 filed on Sep. 18, 2014, the entirety of which is incorporated by reference herein.

BACKGROUND OF THE INVENTION

Field of the Invention

The invention generally relates to fingerprint recognition technology, and more particularly, to a method of generating fingerprint matching information in high-performance environment and generating a fingerprint matching result in high-security environment by referring to the matching information.

Description of the Related Art

In recent years, biometric recognition technology has developed greatly. Since security codes and access cards may be easily stolen or lost, more and more attention has been paid to fingerprint-recognition technology. Fingerprints are unique and never-changing, and each person has multiple fingers for identity recognition. In addition, fingerprints can be easily obtained through fingerprint sensors. Therefore, fingerprint recognition can provide increased security and convenience, and financial security and confidential data can be better protected.

The computing environment of electrical devices, such as wireless devices, mobile phones, personal communication service (PCS) phones, cordless phones, session initiation protocol (SIP) phones, notebooks, and personal digital assistants (PDAs), can be divided into a high-performance environment and a high-security environment. A high-performance environment has higher computing performance but less security. A high-security environment, such as a Trust-Zone or Security Element, has higher security but less computing performance.

When performing fingerprint recognition, the user may swipe or press his or her finger over or on the fingerprint sensor, and then the fingerprint sensor will capture the verification fingerprint image for fingerprint recognition. If the fingerprint recognition is performed in a high-performance environment, the registration fingerprint data and/or the matching result may be tampered with. In addition, when the verification fingerprint data matches with the registration fingerprint data, the matching result may be overwritten. Therefore, the fingerprint recognition may be performed in a high-security environment (e.g. Trust-Zone or Security Element) for increasing security and reliability of fingerprint recognition. However, when fingerprint recognition is performed in a high-security environment, the computation capability of the high-security environment is very limited so that the computing performance for fingerprint recognition may be poor.

BRIEF SUMMARY OF THE INVENTION

A fingerprint recognition method and device are provided to overcome the aforementioned problems.

An embodiment of the invention provides a fingerprint recognition method. The fingerprint recognition method comprises the steps of obtaining a verification fingerprint image; transmitting the verification fingerprint image to the second processing unit; generating verification fingerprint data according to the verification fingerprint image by the second processing unit; transmitting the verification fingerprint data to the first processing unit by the second processing unit; comparing the verification fingerprint data with a plurality of registered fingerprint datasets to generate matching information by the first processing unit; transmitting the matching information from the first processing unit to the second processing unit; and verifying the verification fingerprint data according to the matching information by the second processing unit.

An embodiment of the invention provides a fingerprint recognition method. The fingerprint recognition method comprises the steps of obtaining a verification fingerprint image; transmitting the verification fingerprint image to the first processing unit and the second processing unit; generating first verification fingerprint data according to the verification fingerprint image by the first processing unit; determining whether the first verification fingerprint data is reliable by the second processing unit; comparing the first verification fingerprint data with a plurality of registered fingerprint datasets to generate matching information by the first processing unit if the first verification fingerprint data is reliable; transmitting the matching information from the first processing unit to the second processing unit; and verifying the first verification fingerprint data according to the matching information by the second processing unit.

An embodiment of the invention provides an electronic device. The electronic device comprises a fingerprint sensor, a first processing unit and a Trust-Zone. The fingerprint sensor is configured to obtain a verification fingerprint image. The Trust-Zone comprises a storage unit and a second processing unit. The storage unit is configured to store a plurality of registered fingerprint datasets. The second processing unit is configured to receive the verification fingerprint image from the fingerprint sensor and generate the verification fingerprint data according to the verification fingerprint image. The first processing unit is configured to compare verification fingerprint data with the plurality of registered fingerprint datasets to generate matching information, wherein the second processing unit receives the matching information from the first processing unit and verifies the verification fingerprint data according to the matching information.

An embodiment of the invention provides an electronic device. The electronic device comprises a fingerprint sensor, a first processing unit and a security element. The fingerprint sensor is configured to obtain a verification fingerprint image. The first processing unit is configured to receive the verification fingerprint image, generate the first verification fingerprint data according to the verification fingerprint image, and compare first verification fingerprint data with a plurality of registered fingerprint datasets to generate matching information if the first verification fingerprint data is reliable. The security element comprises a storage unit and a second processing unit. The storage unit is configured to store the plurality of registered fingerprint datasets. The second processing unit is configured to determine whether the first verification fingerprint data is reliable, receive the matching information from the first processing unit and verify the first verification fingerprint data according to the matching information.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
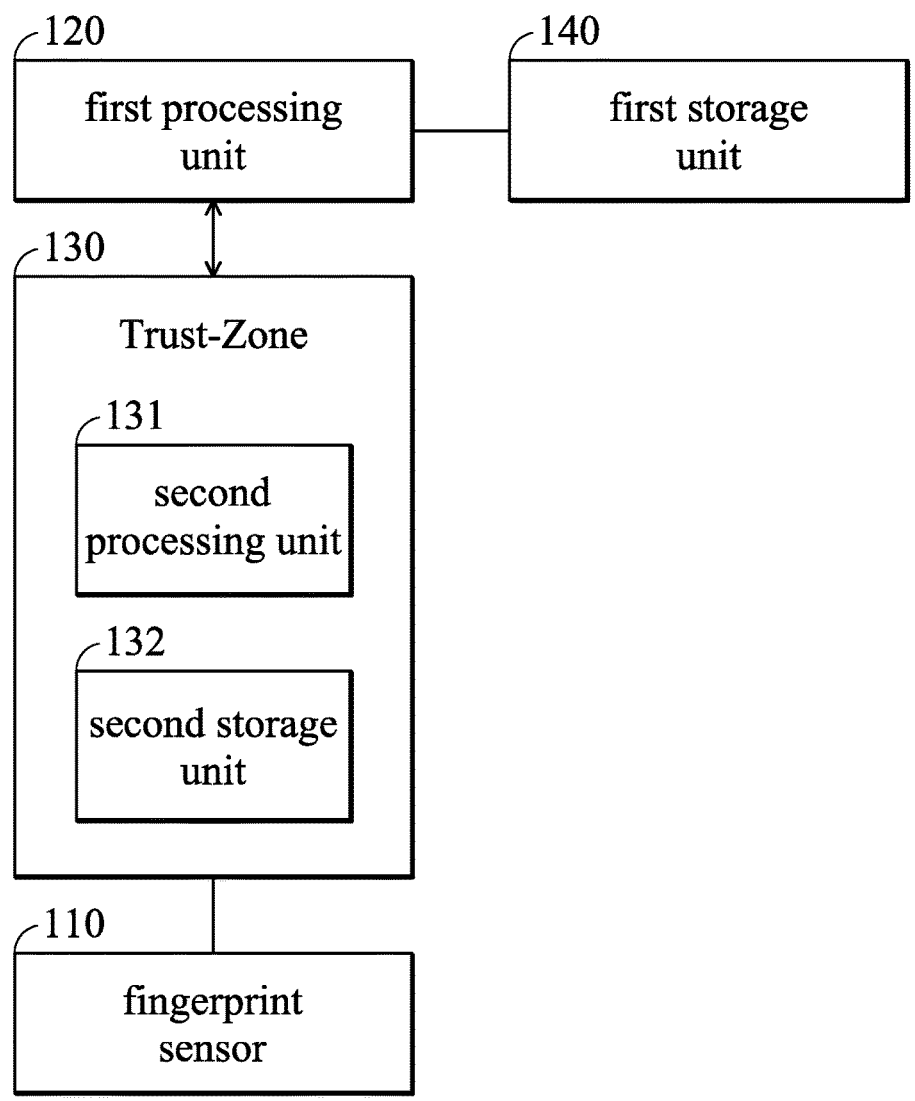
FIG. 1 is a block diagram illustrating an electronic device according to an embodiment of the invention.

FIG. 1 is a block diagram illustrating an electronic device 100 according to an embodiment of the invention. As shown in FIG. 1, the electronic device 100 comprises a fingerprint sensor 110, a first processing unit 120 and a Trust-zone 130, and a storage unit 140. In the embodiment of the invention, the Trust-Zone 130 is based on ARM's® Trust-Zone® technology. The Trust-Zone 130 is an isolated execution environment that guarantees and protects the confidentiality and integrity of the stored-inside code and data. Generally, the Trust-Zone 130 offers an execution space that provides a higher level of security than a rich mobile operating system (mobile OS) and more functionality and computation ability than a secure element (SE). In the embodiment of the invention, the Trust-Zone 130 comprises a second processing unit 131 and a second storage unit 132. The second storage unit 132 may be a non-volatile memory which includes one or more fingerprint databases recording fingerprint information of a user, e.g. a plurality of registered fingerprint datasets. FIG. 1 presents a simplified block diagram in which only the elements relevant to the invention are shown. However, the invention should not be limited to what is shown in FIG. 1.

In an embodiment of the invention, for fingerprint recognition, the user has to swipe or press his or her finger over or on the sensing area of the fingerprint sensor 110. After the user swipes or presses his or her finger on the sensing area of the fingerprint sensor 110, the fingerprint sensor 110 will sense a verification fingerprint image and the verification fingerprint image will be transmitted to the Trust-zone 130. After obtaining the verification fingerprint image, the second processing unit 131 will generate verification fingerprint data according to the verification fingerprint image. Then the second processing unit 131 transmits the verification fingerprint data and the plurality of registered fingerprint datasets stored in the second storage unit 132 to the first processing unit 120.

Figure 2:
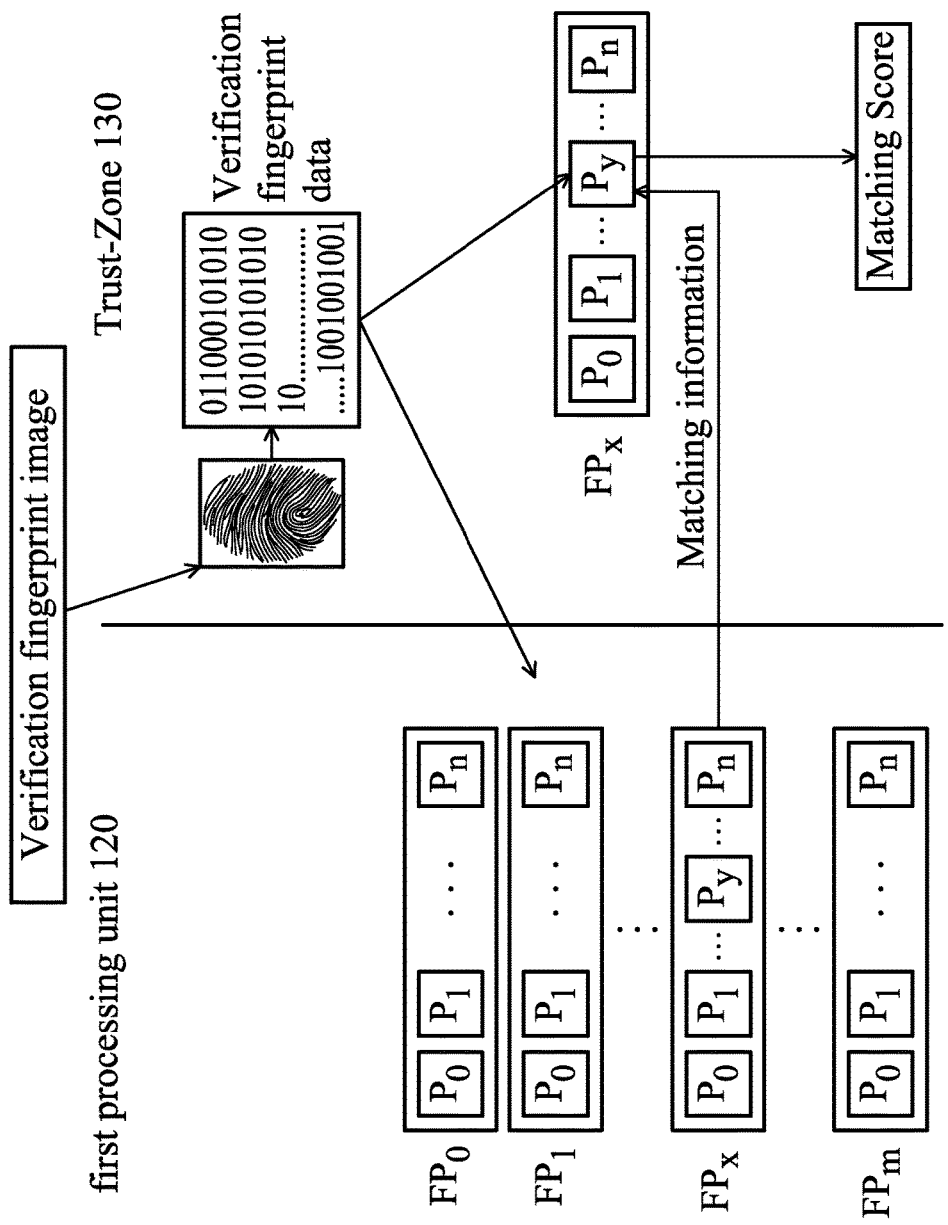
FIG. 2 is a schematic diagram of a fingerprint recognition scheme for a Trust-zone according to an embodiment of the invention.

In an embodiment of the invention, after obtaining the verification fingerprint data and the plurality of registered fingerprint datasets from the second processing unit 131, the first processing unit 120 will compare the verification fingerprint data with the plurality of registered fingerprint datasets to obtain a matching fingerprint template from one of the plurality of registered fingerprint datasets. The first processing unit 120 will also transmit matching information corresponding to the matching fingerprint template to the second processing unit 131. The matching information may include information of rotation and offset between the verification fingerprint data and the matching fingerprint template. For example, as shown in FIG. 2, the first processing unit 120 compares the verification fingerprint data to the registered fingerprint datasets $FP_0, FP_1, \ldots FP_m$, wherein each registered fingerprint dataset $FP_k$ (k=0~m) corresponds to one finger and each registered fingerprint dataset $FP_k$ comprises a plurality of fingerprint templates $p_0, p_1, \ldots p_n$, wherein n indicates the number of the fingerprint templates in each registered fingerprint dataset $FP_k$. After comparing the verification fingerprint data to the registered fingerprint datasets $FP_0, FP_1, \ldots FP_m$, the first processing unit 120 finds that the fingerprint template $p_y$ included in the registered fingerprint dataset $FP_x$ matches the verification fingerprint. Then, the first processing unit 120 will transmit the matching information corresponding to the matching fingerprint template $p_y$ to the second processing unit 131. The matching information comprises the index of the matching fingerprint template $p_y$ included in the registered fingerprint dataset $FP_x(x)$ and the matching details of the matching fingerprint template $p_y$, such as the offset information and rotation information between the verification fingerprint data and matching fingerprint template $p_y$.

After obtaining the matching information corresponding to the matching fingerprint template $p_y$ from the first processing unit 120, the second processing unit 131 will compare the verification fingerprint data with the matching fingerprint template $p_y$ according to the matching information corresponding to the matching fingerprint template $p_y$ so as to generate a matching score. Then, the second processing unit 131 determines whether the matching score is greater than a threshold. The second processing unit 131 will determine that the verification fingerprint is verified, if the matching score is greater than the threshold. The second processing unit 131 will determine the verification fingerprint is not verified, if the matching score is less than the threshold.

Because the second processing unit 131 has obtained the matching information which identifies the matching fingerprint template $p_y$, the second processing unit 131 doesn't need to compare the verification fingerprint data with other fingerprint templates (e.g. $p_0, p_1$) in the registered fingerprint dataset $FP_x$ and the fingerprint templates in other registered fingerprint datasets (e.g. $FP_0, FP_1, FP_m$). Therefore, the security and liability of fingerprint recognition can be promoted since the matching score (i.e. matching result) is provided by Trust-zone 130, the high security environment.

Figure 3:
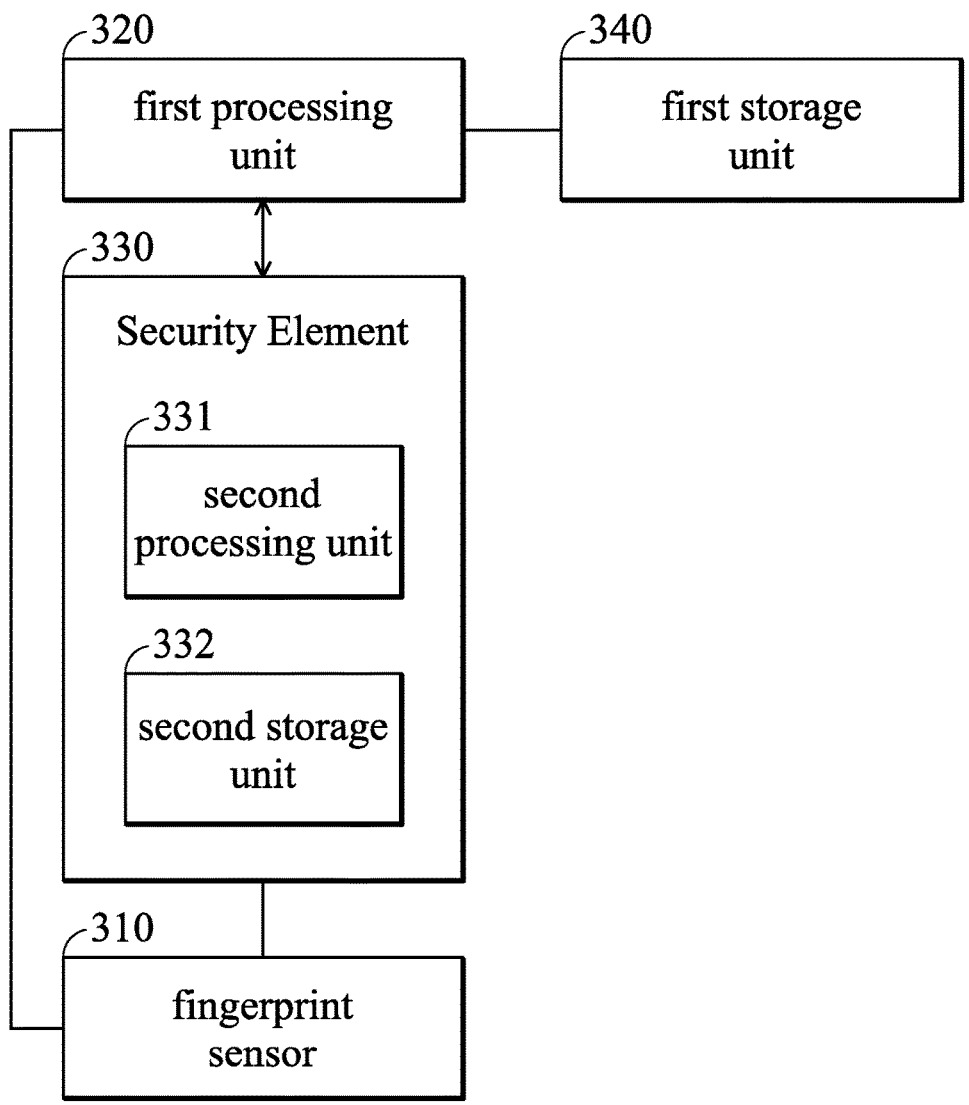
FIG. 3 is a block diagram illustrating an electronic device according to another embodiment of the invention.

FIG. 3 is a block diagram illustrating an electronic device 300 according to another embodiment of the invention. As shown in FIG. 3, the electronic device 300 comprises a fingerprint sensor 310, a first processing unit 320, a Security Element 330, and a first storage unit 340. FIG. 3 presents a simplified block diagram in which only the elements relevant to the invention are shown. However, the invention should not be limited to what is shown in FIG. 3.

In this embodiment of the invention, in FIG. 3, the Security Element 330 is a tamper-resistant platform (typically a one chip secure microcontroller) capable of securely hosting applications and their confidential and cryptographic data (e.g. key management) in accordance with the rules and security requirements set forth by a set of well-identified trusted authorities. In an embodiment, the Security Element 330 comprises a second processing unit 331 and a second storage unit 332. The second processing unit 331, for example, may be a central processing unit (CPU) or a microcontroller. The second storage unit 332 may be a non-volatile memory which includes one or more fingerprint databases recording fingerprint information of a user, e.g. a plurality of registered fingerprint datasets. Note that because the Trust-Zone 130 of FIG. 1 offers an execution space that provides a higher level of computation ability than a secure element (SE), the Trust-zone 130 is configured to generate the verification fingerprint data according to the verification fingerprint image. For example, the Trust-zone 130 is configured to calculate the feature points in the verification fingerprint image so as to generate the verification fingerprint data. However, in the embodiment of FIG. 3, the computation ability of the Security Element 330 is relatively less than the Trust-zone 130. Thus, the Security Element 330 is configured to calculate the feature points in a portion of the verification fingerprint image, rather than the entire image. In other words, the Security Element 330 is configured to generate partial verification fingerprint data corresponding to a portion of the verification fingerprint image. On the other hand, the first processing unit 320 will generate the verification fingerprint data corresponding to the entire verification fingerprint image and provide the verification fingerprint data to the Security Element 330 Then, the Security Element 330 will use the partial verification fingerprint data generated by itself to verify the verification fingerprint data generated by the first processing unit 320. The detailed description will be illustrated as follow.

In the embodiment of the invention, for fingerprint recognition, the user has to swipe or press his or her finger over or on the sensing area of the fingerprint sensor 310. After the user swipes or presses his or her finger over or on the sensing area of the fingerprint sensor 310, the fingerprint sensor 310 will sense a verification fingerprint image and the verification fingerprint image will be transmitted to the Security Element 330 and to the first processing unit 320.

The first processing unit 320 will generate first verification fingerprint data according to the verification fingerprint image after obtaining the verification fingerprint image. Then, the first processing unit 320 transmits the first verification fingerprint data to the second processing unit 331.

After obtaining the verification fingerprint image, the second processing unit 331 will generate second verification fingerprint data according to the verification fingerprint image. Then second processing unit 331 will compare the second verification fingerprint data with the first verification fingerprint data which is transmitted from the first processing unit 320 to determine whether the second verification fingerprint data appears in the first verification fingerprint data.

If the second verification fingerprint data appears in the first verification fingerprint data, the second processing unit 331 will determine the first verification fingerprint data from the first processing unit 320 is reliable. If the second verification fingerprint data does not appear in the first verification fingerprint data, the second processing unit 331 will determine the first verification fingerprint data from the first processing unit 320 is not reliable and terminate the fingerprint recognition.

Figure 4:
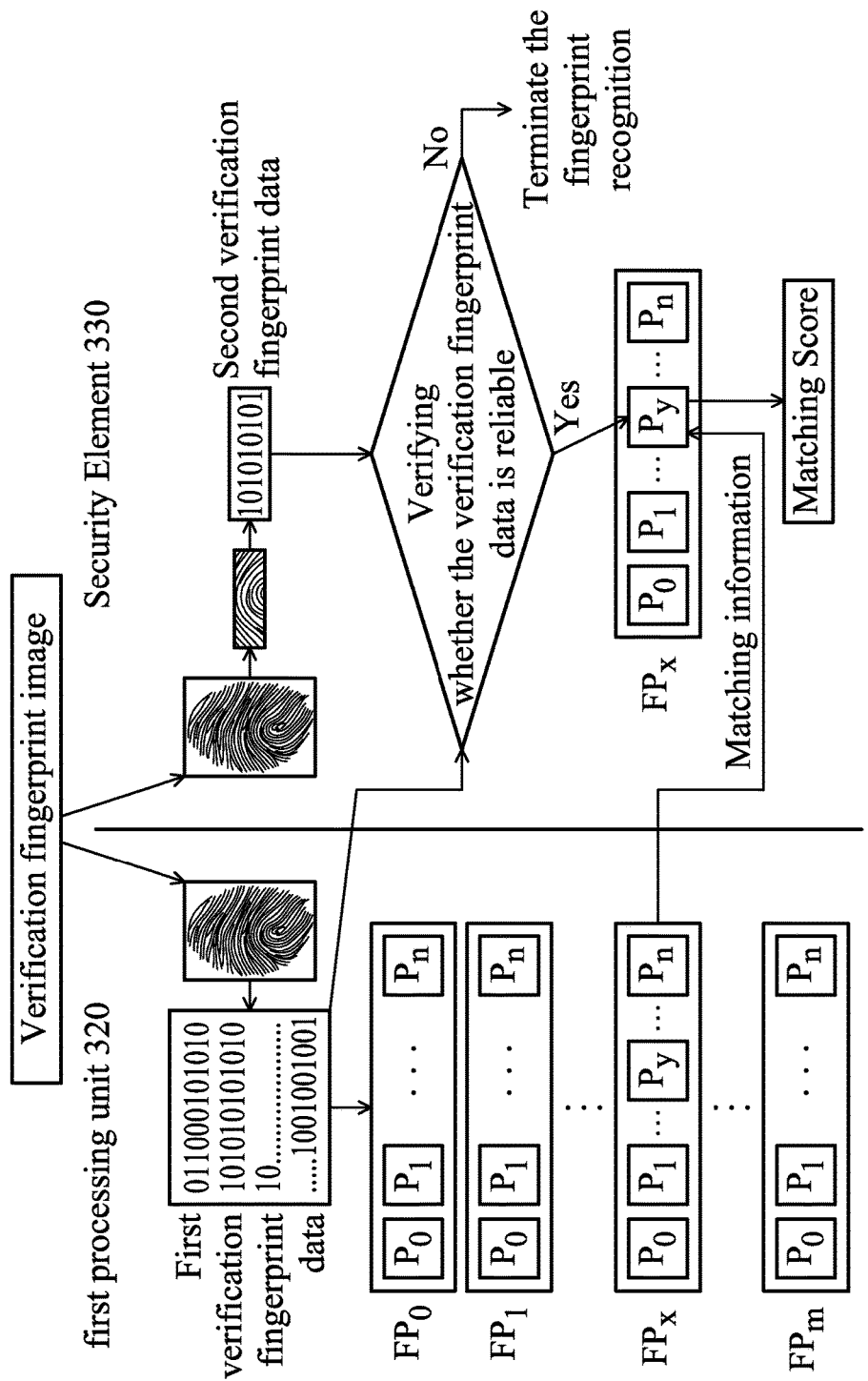
FIG. 4 is a schematic diagram of a fingerprint recognition scheme for a Security Element according to another embodiment of the invention.

If the first verification fingerprint data is reliable, the second processing unit will transmit the registered fingerprint datasets stored in the second storage unit 332 to the first processing unit 320. Then, the first processing unit 320 compares the first verification fingerprint data with the plurality of registered fingerprint datasets to find a matching fingerprint template from the plurality of registered fingerprint datasets. Then, the first processing unit 320 will transmit the matching information corresponding to the matching fingerprint template to the second processing unit 331. The matching information may include information of rotation and offset between the verification fingerprint data and the matching fingerprint template. For example, as shown in FIG. 4, if the first verification fingerprint data is reliable, the first processing unit 320 will receive the registered fingerprint datasets $FP_0, FP_1, \ldots FP_m$ from the second processing unit 331 and compare the first verification fingerprint data to the registered fingerprint datasets $FP_0, FP_1, \ldots FP_m$. Each registered fingerprint dataset $FP_k$ (k=0~m) corresponds to one finger and each registered fingerprint dataset $FP_k$ comprises a plurality of fingerprint templates $p_0, p_1, \ldots p_n$, wherein n indicates the number of the fingerprint templates in each registered fingerprint dataset $FP_k$. After comparing the first verification fingerprint data to the registered fingerprint datasets $FP_0, FP_1, \ldots FP_m$, the first processing unit 320 finds that the fingerprint template $p_y$ included in the registered fingerprint dataset $FP_x$ matches the first verification fingerprint data. Then, the first processing unit 320 will transmit the matching information corresponding to the matching fingerprint template $p_y$ to the second processing unit 331. The matching information comprises the index of the matching fingerprint template $p_y$ included in the registered fingerprint dataset $FP_x(x)$ and the matching details of the matching fingerprint template $p_y$, such as the offset information and rotation information between the first verification fingerprint data and matching fingerprint template $p_y$.

When the second processing unit 331 receives the matching information, the second processing unit 331 will compare the first verification fingerprint data with the matching fingerprint template $p_y$ according to the matching information corresponding to the matching fingerprint template $p_y$ so as to generate a matching score. Then, the second processing unit 331 determines whether the matching score is greater than a threshold. The second processing unit 331 will determine that the verification fingerprint is verified, if the matching score is greater than the threshold. The second processing unit 331 will determine the verification fingerprint is not verified, if the matching score is less than the threshold.

Because the second processing unit 331 has verified the first verification fingerprint data and obtained the matching information which identifies the matching fingerprint template $p_y$, the second processing unit 331 doesn't need to compare the verification fingerprint data with other fingerprint templates (e.g. $p_0, p_1$) in the registered fingerprint dataset $FP_x$ and the fingerprint templates in other registered fingerprint datasets (e.g. $FP_0, FP_1, FP_m$). Therefore, the security and liability of fingerprint recognition can be promoted since the matching score (i.e. matching result) is provided by Security Element 330, the high security environment.

Figure 5A:
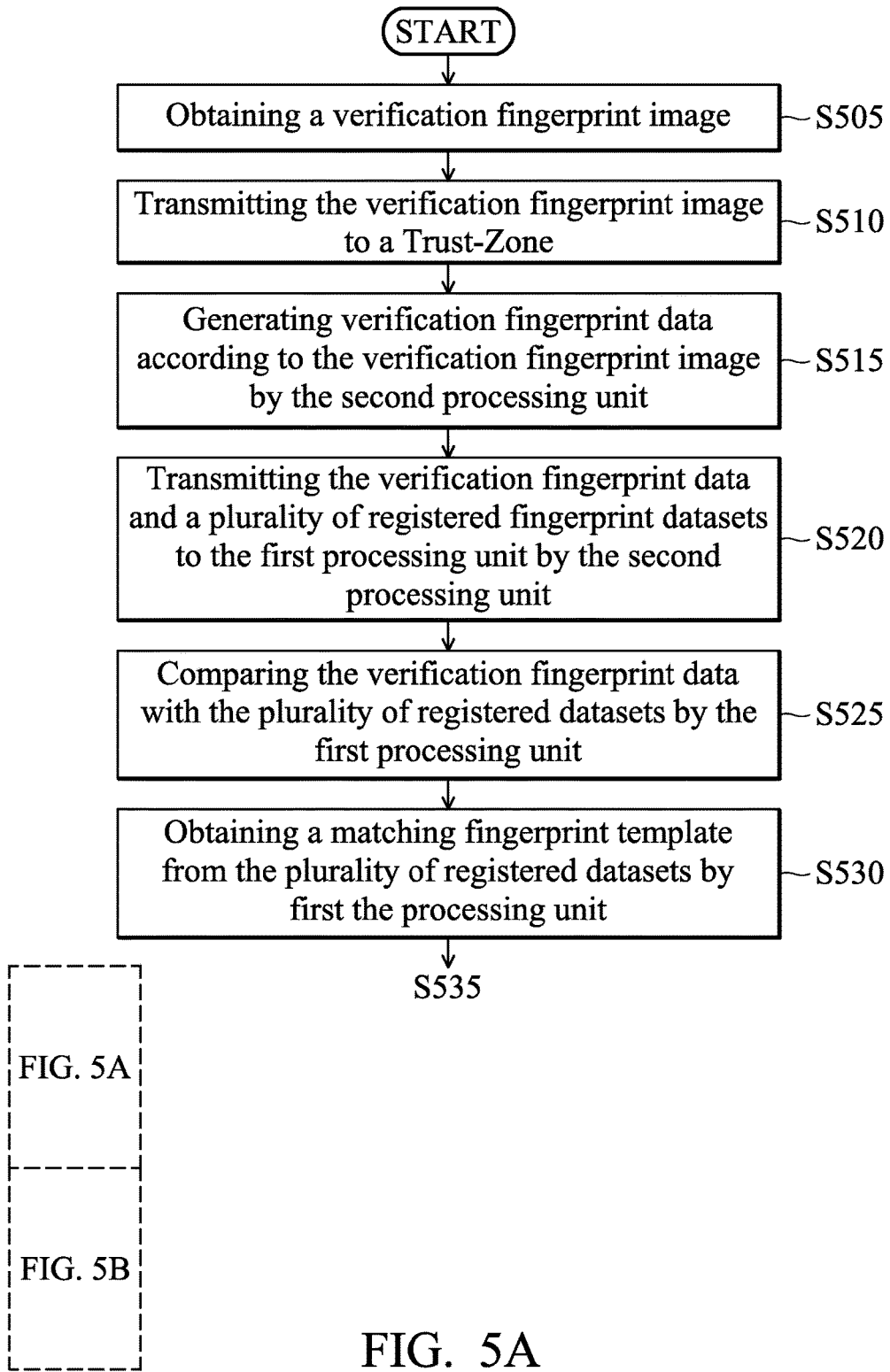
FIG. 5A-5B are flow charts illustrating a fingerprint recognition method according to an embodiment of the invention.
Figure 5B:
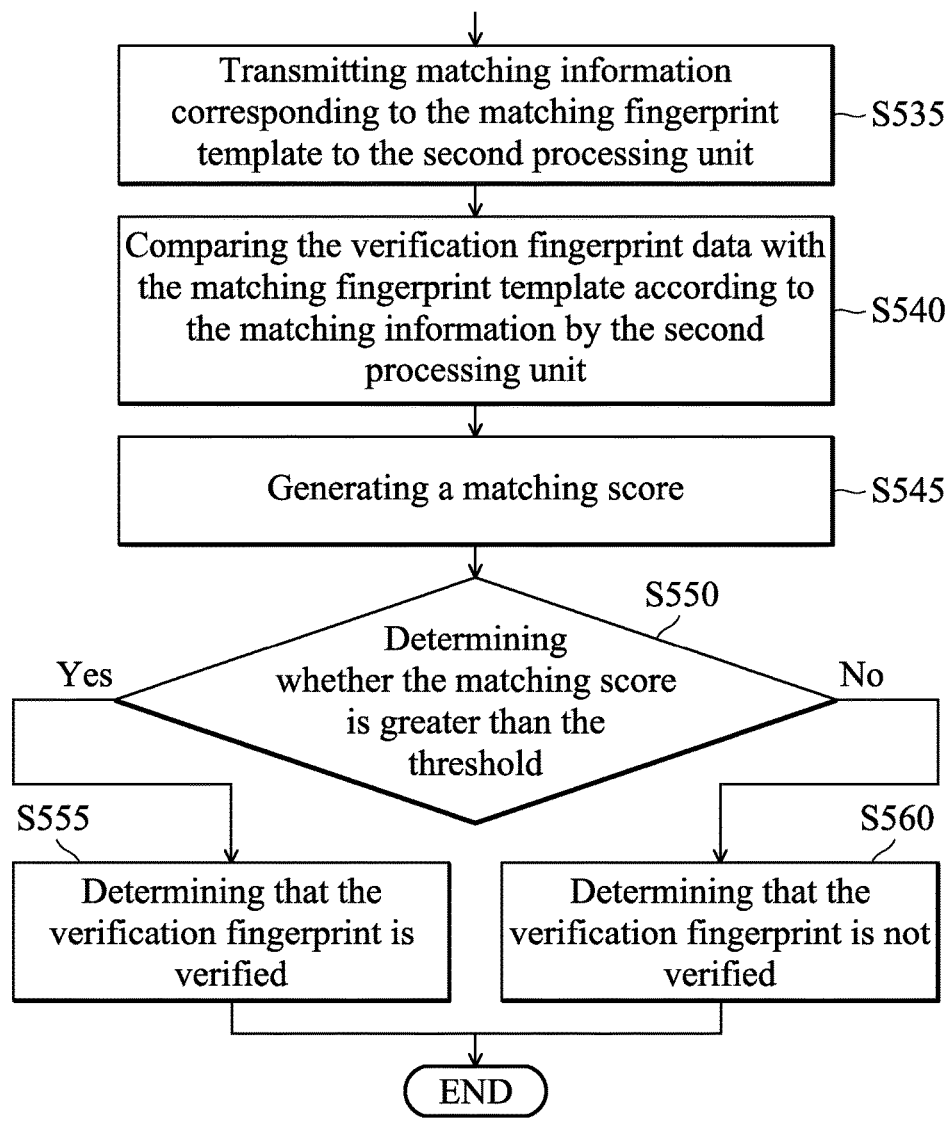

FIGS. 5A-5B is a flow chart illustrating a fingerprint recognition method according to an embodiment of the invention. The fingerprint recognition method is applied to the electronic device 100. As shown in FIGS. 5A-5B, in step S505, a verification fingerprint image is obtained by the fingerprint sensor 110. In step S510, the verification fingerprint image is transmitted to the Trust-Zone 130. In step S515, the verification fingerprint data is generated according to the verification fingerprint image by the second processing unit 131. In step S520, the verification fingerprint data and a plurality of registered fingerprint datasets are transmitted to the first processing unit 120 by second processing unit 131. In step S525, the verification fingerprint data is compared with the plurality of registered fingerprint datasets by the first processing unit 120. In step S530, a matching fingerprint template is obtained from the plurality of registered fingerprint datasets by the first processing unit 120.

In step S535, the matching information corresponding to the matching fingerprint template is transmitted to the second processing unit 131 by the first processing unit 120. In step S540, the verification fingerprint data is compared with the matching fingerprint template by the second processing unit 131 according to the matching information. In step S545, a matching score is generated by the second processing unit 131 after comparing the verification fingerprint data with the matching fingerprint template.

In step S550, the matching score is compared with a threshold by the second processing unit 131 to determine whether the matching score is greater than the threshold. In step S555, if the matching score is greater than a threshold, the second processing unit 131 determines that the verification fingerprint is verified. In step S560, if the matching score is less than a threshold, the second processing unit 131 determines that the verification fingerprint is not verified.

Figure 6A:
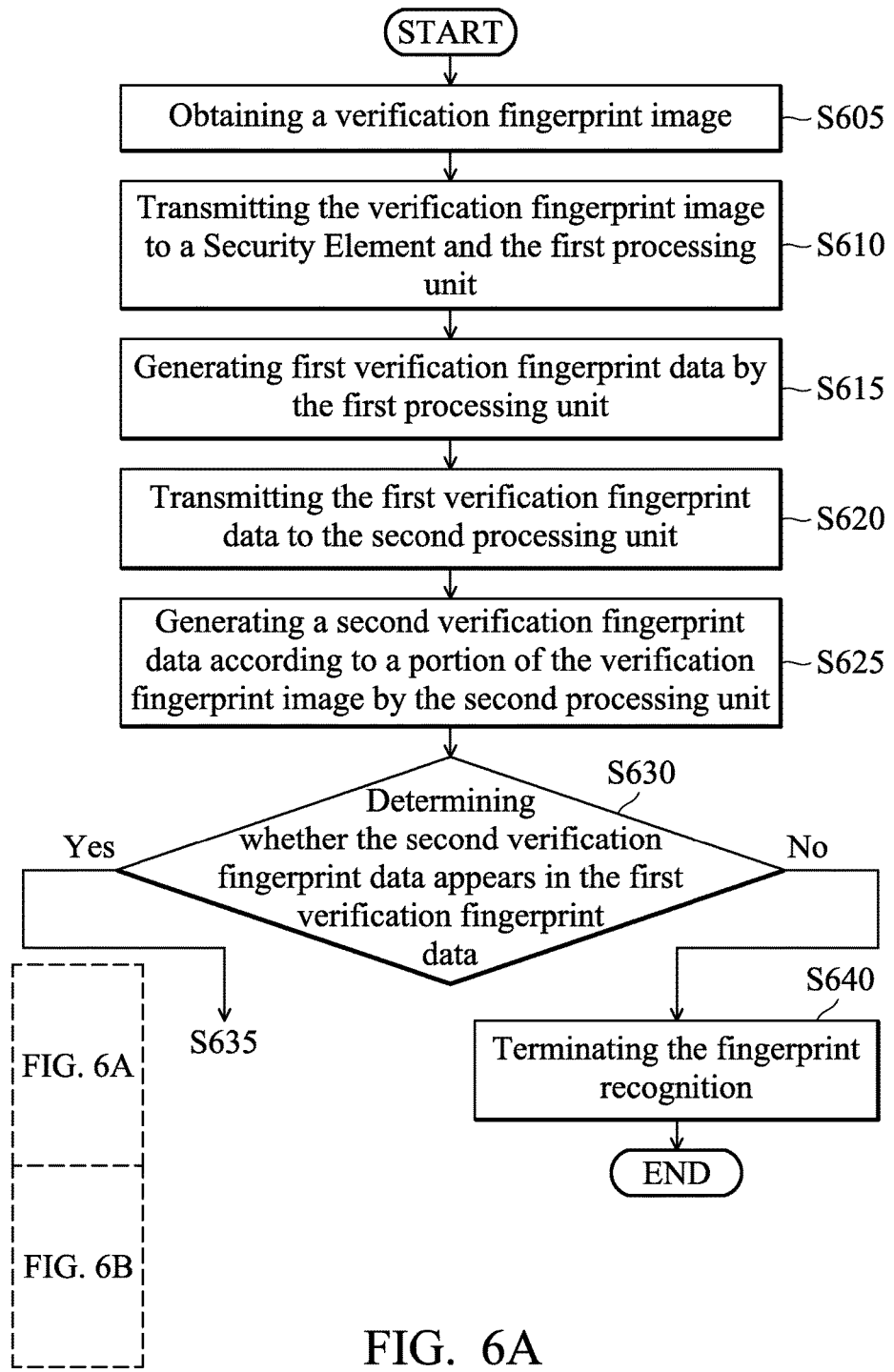
FIG. 6A-6B are flow charts illustrating a fingerprint recognition method according to another embodiment of the invention.
Figure 6B:
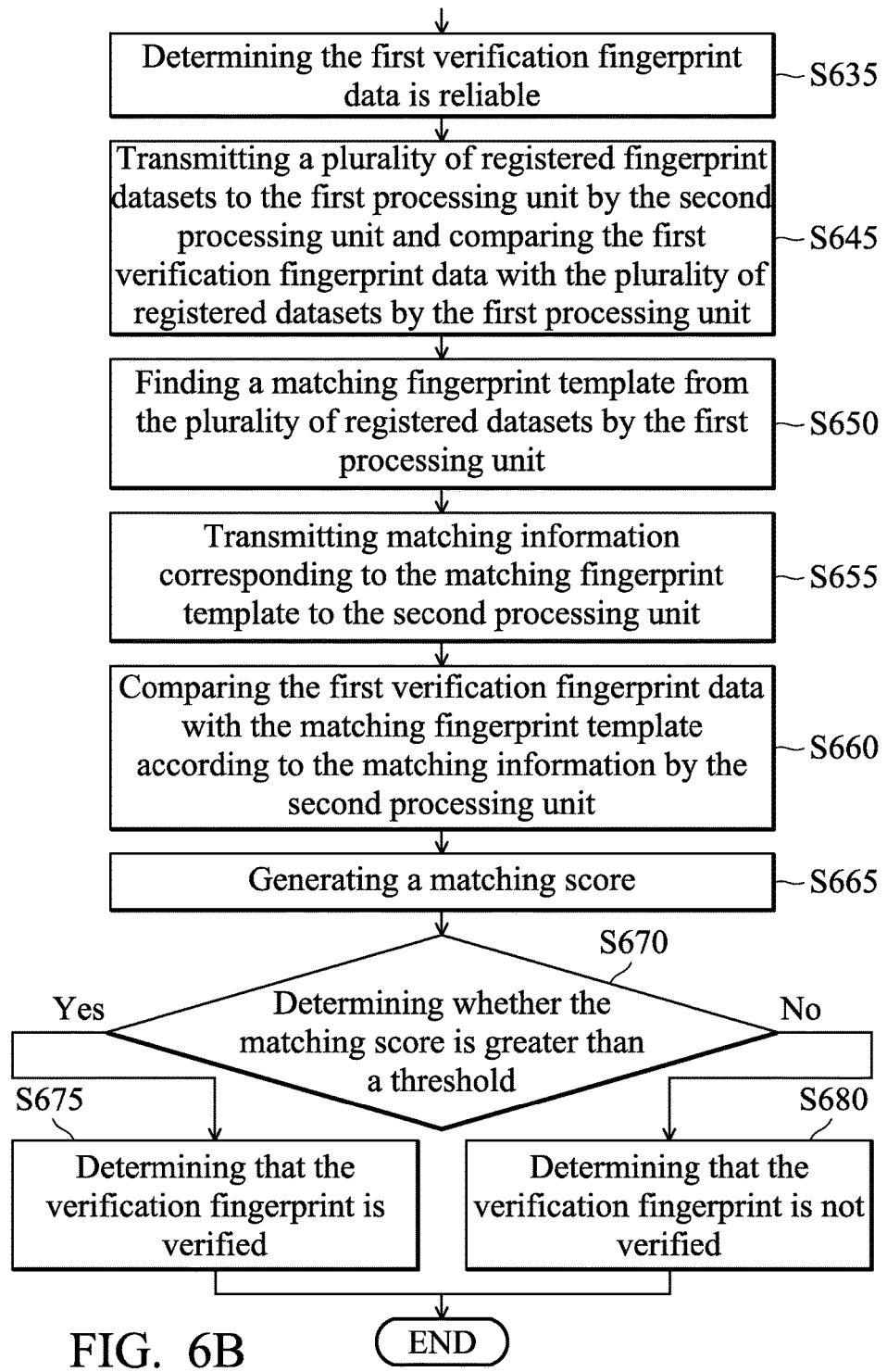

FIGS. 6A-6B is a flow chart illustrating a fingerprint recognition method according to another embodiment of the invention. The fingerprint recognition method is applied to the electronic device 300. As shown in FIGS. 6A-6B., in step S605, a verification fingerprint image is obtained by the fingerprint sensor 310. In step S610, the verification fingerprint image is transmitted to the Security Element 300 and the first processing unit 320. In step S615, a first verification fingerprint data is generated according to the verification fingerprint image by the first processing unit 320. In step S620, the first verification fingerprint data is transmitted to the second processing unit 331 by the first processing unit 320. In step S625, a second verification fingerprint data is generated according to a portion of the verification fingerprint image by the second processing unit 331.

In step S630, the second verification fingerprint data is compared with the first verification fingerprint data by the second processing unit 331 to determine whether the second verification fingerprint data appears in the first verification fingerprint data. In step S635, if the second verification fingerprint data appears in the first verification fingerprint data, the second processing unit 331 determines that the first verification fingerprint data is reliable. In step S640, if the second verification fingerprint data does not appear in the first verification fingerprint data, the fingerprint recognition is terminated.

In step S645, a plurality of registered fingerprint datasets are transmitted to the first processing unit 320 by the second processing unit 331, and the first verification fingerprint data is compared with the plurality of registered fingerprint datasets by the first processing unit 320. In step S650, a matching fingerprint template is found from the plurality of registered fingerprint datasets by the first processing unit 320. In step S655, the matching information that corresponds to the matching fingerprint template is transmitted to the second processing unit 331.

In step S660, the first verification fingerprint data is compared with the matching fingerprint template by the second processing unit 331 according to the matching information. In step S665, a matching score is generated by the second processing unit 331 after comparing the first verification fingerprint data with the matching fingerprint template. In step S670, the matching score is compared with a threshold by the second processing unit 331 to determine whether the matching score is greater than a threshold. In step S675, if the matching score is greater than the threshold, the second processing unit 331 determines that the verification fingerprint is verified. In step S680, if the matching score is less than the threshold, the second processing unit 331 determines that the verification fingerprint is not verified.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects of the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fingerprint-recognition method, applied to an electronic device, the electronic device comprising a first processing unit and a security environment, the security environment comprising a second processing unit, the fingerprint-recognition method comprising:

obtaining a verification fingerprint image;
transmitting the verification fingerprint image to the second processing unit;
generating verification fingerprint data according to the verification fingerprint image by the second processing unit;
transmitting the verification fingerprint data to the first processing unit by the second processing unit;
comparing the verification fingerprint data with a plurality of registered fingerprint datasets to generate matching information by the first processing unit;
transmitting the matching information from the first processing unit to the second processing unit; and
verifying the verification fingerprint data according to the matching information by the second processing unit.

2. The fingerprint recognition method of claim 1, further comprising:
transmitting the plurality of registered fingerprint datasets stored in the security environment to the first processing unit by the second processing unit.

3. The fingerprint recognition method of claim 1, further comprising:
obtaining a matching fingerprint template from the plurality of registered fingerprint datasets by the first processing unit.

4. The fingerprint recognition method of claim 3, wherein the matching information comprises an index corresponding to the matching fingerprint template included in the registered fingerprint datasets and matching details between the verification fingerprint data and the matching fingerprint template, wherein the matching details comprise offset information and rotation information between the verification fingerprint data and the matching fingerprint template.

5. The fingerprint recognition method of claim 3, further comprising:
generating a matching score by comparing the verification fingerprint data with the matching fingerprint template according to the matching information by the second processing unit; and
determining whether the matching score is greater than a threshold by the second processing unit.

6. A fingerprint-recognition method, applied to an electronic device, the electronic device comprising a first processing unit and a security environment, the security environment comprising a second processing unit, the fingerprint-recognition method comprising:
obtaining a verification fingerprint image;
transmitting the verification fingerprint image to the first processing unit and the second processing unit;
generating first verification fingerprint data according to the verification fingerprint image by the first processing unit;
determining whether the first verification fingerprint data is reliable by the second processing unit;
comparing the first verification fingerprint data with a plurality of registered fingerprint datasets to generate matching information by the first processing unit, if the first verification fingerprint data is reliable;
transmitting matching information from the first processing unit to the second processing unit; and
verifying the first verification fingerprint data according to the matching information by the second processing unit.

7. The fingerprint recognition method of claim 6, further comprising:

generating second verification fingerprint data according to a portion of the verification fingerprint image by the second processing unit;
transmitting the first verification fingerprint data to the second processing unit by the first processing unit;
comparing the second verification fingerprint data with the first verification fingerprint data by the second processing unit to determine whether the second verification fingerprint data appears in the first verification fingerprint data;
determining that the first verification fingerprint data is reliable if the second verification fingerprint data appears in the first verification fingerprint data; and
terminating the fingerprint recognition if the second verification fingerprint data does not appear in the first verification fingerprint data.

8. The fingerprint recognition method of claim 6, further comprising:
obtaining a matching fingerprint template from the plurality of registered fingerprint datasets by the first processing unit.

9. The fingerprint recognition method of claim 8, wherein the matching information comprises an index corresponding to the matching fingerprint template included in the registered fingerprint datasets and matching details between the verification fingerprint data and the matching fingerprint template, wherein the matching details comprise offset information and rotation information between the first verification fingerprint data and the matching fingerprint template.

10. The fingerprint recognition method of claim 6, further comprising:
generating a matching score by comparing the verification fingerprint data with the matching fingerprint template according to the matching information by the second processing unit; and
determining whether the matching score is greater than a threshold by the second processing unit.

11. An electronic device, comprising:
a fingerprint sensor, obtaining a verification fingerprint image;
a security environment connected to the fingerprint sensor, comprising:
a storage unit, storing a plurality of registered fingerprint datasets; and
a second processing unit, receiving the verification fingerprint image from the fingerprint sensor, and generating the verification fingerprint data according to the verification fingerprint image; and
a first processing unit, connected to the security environment and comparing the verification fingerprint data with the plurality of registered fingerprint datasets to generate matching information;
wherein the second processing unit receives the matching information from the first processing unit and verifies the verification fingerprint data according to the matching information.

12. The electronic device of claim 11, wherein the second processing unit transmits the plurality of registered fingerprint datasets stored in the storage unit to the first processing unit.

13. The electronic device of claim 11, wherein the first processing unit obtains a matching fingerprint template from the plurality of registered fingerprint datasets.

14. The electronic device of claim 13, wherein the matching information comprises an index corresponding to the matching fingerprint template included in the registered fingerprint datasets and matching details between the verification fingerprint data and the matching fingerprint template, wherein the matching details comprise offset information and rotation information between the verification fingerprint data and the matching fingerprint template.

15. The electronic device of claim 11, wherein the second processing unit compares the verification fingerprint data with the matching fingerprint template according to the matching information to generate a matching score and then determines whether the matching score is greater than a threshold.

16. An electronic device, comprising:
   a fingerprint sensor, obtaining a verification fingerprint image;
   a first processing unit, connected to the fingerprint sensor and receiving the verification fingerprint image, generating the first verification fingerprint data according to the verification fingerprint image, and comparing the first verification fingerprint data with a plurality of registered fingerprint datasets to generate matching information if the first verification fingerprint data is reliable; and
   a security environment connected to the first processing unit, comprising:
   a storage unit, storing the plurality of registered fingerprint datasets;
   a second processing unit, receiving the verification fingerprint image from the fingerprint sensor, determining whether the first verification fingerprint data is reliable, receiving the matching information from the first processing unit and verifying the first verification fingerprint data according to the matching information.

17. The electronic device of claim 16, wherein the second processing unit generates second verification fingerprint data according to a portion of the verification fingerprint image.

18. The electronic device of claim 17, wherein the first processing unit transmitting the first verification fingerprint data to the second processing unit and the second processing unit compares the second verification fingerprint data with the first verification fingerprint data to determine whether the second verification fingerprint data appears in the first verification fingerprint data.

19. The electronic device of claim 18, wherein the second processing unit determines that the first verification fingerprint data is reliable if the second verification fingerprint data appears in the first verification fingerprint data; and terminates the fingerprint recognition if the second verification fingerprint data does not appear in the first verification fingerprint data.

20. The electronic device of claim 16, wherein the first processing unit obtains a matching fingerprint template from the plurality of registered fingerprint datasets.

21. The electronic device of claim 20, wherein the matching information comprises an index corresponding to the matching fingerprint template included in the registered fingerprint datasets and matching details between the verification fingerprint data and the matching fingerprint template, wherein the matching details comprise offset information and rotation information between the first verification fingerprint data and the matching fingerprint template.

22. The electronic device of claim 16, wherein the second processing unit generates a matching score by comparing the first verification fingerprint data with the matching fingerprint template according to the matching information and determines whether the matching score is greater than a threshold.

* * * * *